United States Patent [19]

Gordon et al.

[11] Patent Number: 4,670,358
[45] Date of Patent: Jun. 2, 1987

[54] ELECTROCHEMICAL POWER GENERATION

[75] Inventors: Arnold Z. Gordon, Lyndhurst; Harry Everett, Jr., Cleveland Heights, both of Ohio

[73] Assignee: Gould Inc., Rolling Meadows, Ill.

[21] Appl. No.: 835,771

[22] Filed: Mar. 3, 1986

[51] Int. Cl.[4] .................... H01M 6/00; H01M 8/08
[52] U.S. Cl. .................................. 429/15; 429/105; 429/200
[58] Field of Search ............... 429/14, 15, 101, 105, 429/200, 201

[56] References Cited

U.S. PATENT DOCUMENTS

| | | | |
|---|---|---|---|
| 3,791,871 | 2/1974 | Rowley | 136/100 |
| 3,976,509 | 8/1976 | Tsai et al. | 136/154 |
| 4,007,057 | 2/1977 | Littauer et al. | 429/57 |
| 4,528,248 | 7/1985 | Galbraith | 429/8 |

Primary Examiner—Donald L. Walton
Attorney, Agent, or Firm—Wood, Dalton, Phillips, Mason & Rowe

[57] ABSTRACT

A power generation system utilizing an electrochemical cell comprising a reactive metal anode, a cathode spaced from the anode and an electrolyte comprising an aqueous solution of the hydroxide of the reactive metal is disclosed. The hydroxide concentration in the electrolyte is controlled by contacting the electrolyte with at least one complex comprising a hydrogen fluoride adduct to a fluoride salt to form at least one compound of the reactive metal which is insoluble in the electrolyte. The insoluble compound is separated from the electrolyte and the electrolyte is recirculated to the electrochemical cell.

16 Claims, 1 Drawing Figure

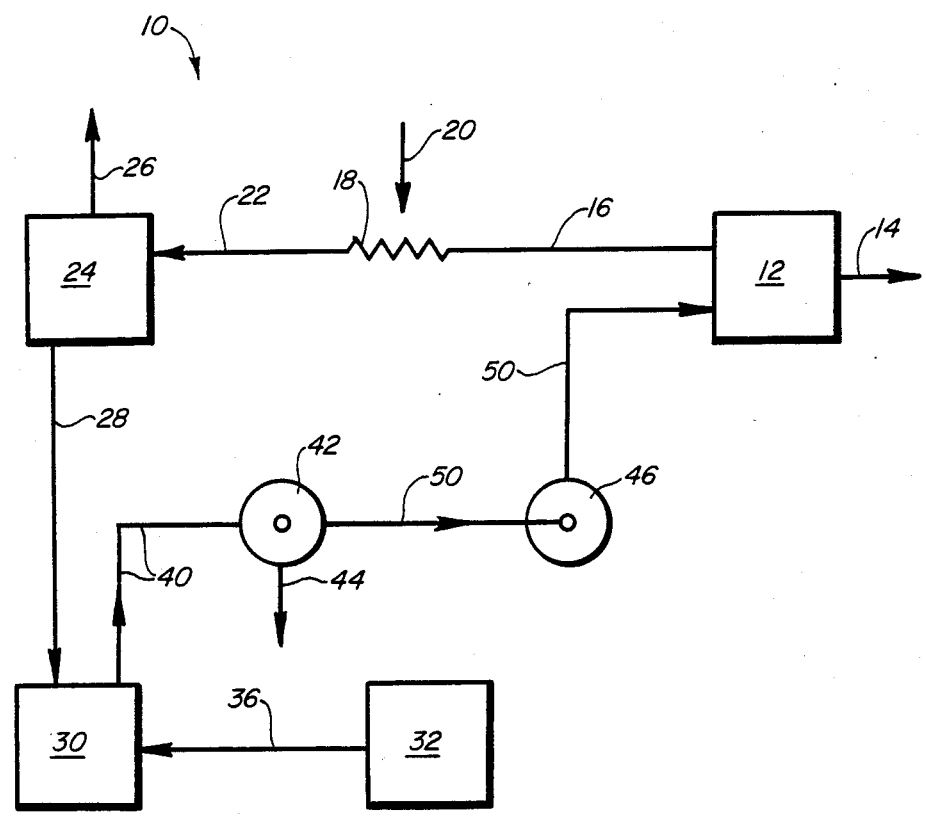

ELECTROCHEMICAL POWER GENERATION

BACKGROUND OF THE INVENTION

1. Field of the Invention

This invention relates generally to power generation systems and, more particularly, this invention relates to electrochemical cells and methods for improving performance therein.

2. Description of Related Art

Electrochemical cells utilizing a reactive metal anode, an electrically conductive cathode, and an aqueous electrolyte are well known. Such cells are described in detail in numerous patents and publications, including Rowley U.S. Pat. No. 3,791,871 (Feb. 12, 1974) and Galbraith U.S. Pat. No. 4,528,248 (July 9, 1985), the respective disclosures of which are incorporated herein by reference.

The cell disclosed in the Rowley patent typifies prior electrochemical cells and utilizes a metal anode which is highly reactive with water and spaced from a cathode by an electrically insulating film formed on the anode in the presence of water. The anode and cathode are in contact with an aqueous electrolyte during cell operation. In the cell of the Rowley patent, the anode comprises an elemental alkali metal such as sodium or lithium, and the electrolyte comprises an aqueous solution of sodium hydroxide or lithium hydroxide, respectively, produced by the electrochemical reaction of the anodic metal with water.

The anode of the Rowley patent is coated with a thin film of a non-reactive, sparingly water soluble material which is not electrically conductive. The film is porous and allows transport of aqueous electrolyte to the anode and transport of reaction products away from the anode. Preferably, the film is the natural hydrated oxide which forms on the metal surface as it is exposed to humid air. However, other suitable water soluble insulators may serve as the film.

The electrolyte of the cell disclosed in the Rowley patent is preferably a hydroxide of the alkali metal utilized as the anode since such hydroxide is naturally formed during operation of the cell and hence the cell automatically regenerates the electrolyte during operation. Thus, in the Rowley cell, water is introduced to the cell at a restricted rate and brought into direct contact with both the cathode and the anode. The water dissolves a portion of the soluble film on the anode, resulting in the production of a hydrated hydroxide of the anode material. plus heat. As the reaction proceeds, useful electrical power is produced.

The anode and the cathode are not in direct electrical contact with each other, but circuit connections are made at each electrode for drawing electrical power from the cell.

The alkali metal of the anode is highly reactive with water. This reactivity, however, decreases as the concentration of metal hydroxide in the electrolyte increases. As the metallic hydroxide concentration in the cell rises, the rate of power generation from the cell correspondingly diminishes, and passivation of the anode can occur if the electrolyte becomes saturated with the metal hydroxide. Thus, to maintain a desired level of power output from such electrochemical cells, relatively high concentrations of the reactive metal hydroxide should be avoided. Therefore, steps must be taken to maintain the reactive metal hydroxide concentration in the electrolyte at a level at which useful electrical current is produced. Optimally (at typical operating temperatures), the concentration of the metal hydroxide in the electrolyte is maintained at about 80% of saturation for the electrolyte.

One solution to the problem of too great a concentration of the reactive metal hydroxide in the electrolyte is the continuous expulsion of a fraction of the electrolyte stream into the surrounding environment and the simultaneous injection of a similar flow rate of fresh water into the electrolyte. If the stream input and output are kept balanced and prorated by metal hydroxide production, this technique is effective. However, the technique has several disadvantages. Firstly, the motion of the inlet and outlet flow streams results in significant noise levels and the noise generated may exceed desired and/or tolerable noise limits. Secondly, the technique requires a continuous source of fresh feed water. For non-marine applications, there is no such ready source of inlet water and even if such inlet water were carried on board, its weight would, in most uses, be prohibitive. Accordingly, all such closed loop electrochemical cells require some form of "electrolyte management", i.e., the removal of the reactive metal hydroxide from the circulated electrolyte.

The use of simple acids, such as phosphoric acid, hydrogen fluoride, etc., as an electrolyte management agent for closed loop electrochemical cells, wherein the simple acid acts as a precipitant for the reactive metal hydroxide, generally suffers from the relatively great overhead weight burden imposed on the cell per gram of reactive metal hydroxide removed from the circulated electrolyte. Also. the extreme toxicity, volatility and dangerous propensities exhibited by some simple acids, such as hydrogen fluoride, make these materials unattractive as electrolyte management agents.

SUMMARY OF THE INVENTION

It is object of the invention to overcome one or more of the problems described above.

According to the invention, a power generation system comprises an electrochemical cell including a reactive metal anode, a cathode spaced from the anode and an electrolyte comprising an aqueous solution of the hydroxide of the reactive metal. In addition, the system includes a source of at least one complex comprising a hydrogen fluoride adduct to a fluoride salt, which upon contact with the electrolyte, precipitates at least one compound of the reactive metal which is insoluble in the electrolyte.

The insoluble compound so formed is then separated from the electrolyte, thus reducing the hydroxide concentration in the electrolyte. The resulting electrolyte is recirculated to the electrochemical cell for continuous and efficient cell operation.

Other objects and advantages will be apparent to those skilled in the art from the following detailed description taken in conjunction with the drawing and the appended claims.

BRIEF DESCRIPTION OF THE DRAWING

The sole FIGURE is a schematic flow diagram of a system for electrolyte management according a typical embodiment of the invention.

DETAILED DESCRIPTION OF THE INVENTION

According to the invention, a power generation system and a method of power generation and electrolyte management in aqueous/reactive metal electrochemical cells is provided. The invention contemplates a system for power generation having an electrochemical cell with a lithium or other reactive metal anode. The present invention may be used with any configuration of cell which operates to produce the hydroxide of the anodic metal in an aqueous electrolyte. The cell typically includes a reactive metal anode, a cathode spaced from the anode to define a reaction zone therewith and an alkaline electrolyte (with or without additives). The electrolyte preferably comprises an aqueous solution of the hydroxide of the anodic metal.

Lithium is a preferred anodic material because of its high energy density. Other reactive metals, such as other alkali metals, for example, may be used. The metal of the anode may be present in elemental, compound, alloy, amalgam or mixture form, as desired. Reference herein to the preferred lithium is exemplary only, and the invention is understood to encompass the use of other reactive metals.

An electrochemical reaction occurs at the anode, as is well known, to produce a cation of the anodic metal, and an electron. The anodic cation reacts with the negatively charged ionic specie (typically hydroxide ion) in the electrolyte to form an anodic reaction product, typically lithium hydroxide (LiOH) in the case of a lithium anode.

As is well known in the art, alkali metal anodes are coated with a water-soluble, metal ion permeable insulating coating of the hydrated hydroxide of the anodic metal. This coating naturally forms on the anode upon exposure of the anode to humid air and acts to modulate the electrochemical reaction.

The metal hydroxide coating on the anode typically effects spacing between the anode and cathode, which may be in physical contact, but not direct electrical contact with each other. As is well known in the art, however, other physical spacers, such as foam, screen, beads or combinations thereof, may be present.

Referring to the FIGURE, a system, generally designated 10, for electrolyte management is shown. The system 10 includes a cell stack 12 comprising a plurality of reactive metal anode electrochemical cells. It is to be understood, however, that the invention may also be practiced with an individual electrochemical cell.

The cell stack 12 generates an electrical power output 14 which can be used for work. An electrolyte flow stream 16, containing dissolved lithium hydroxide with hydrogen gas dispersed therein, is circulated from the cell stack 12 through a heat exchanger 18. The hydrogen gas forms as a by-product of the parasitic corrosion reaction which occurs in each cell of the stack 12. The heat exchanger 18 removes heat from the stream 16 by indirectly contacting the stream 16 with a cooling stream 20 of air or water passing through heat exchanger 18. Cooling of the stream 16 facilitates handling of the electrolyte.

A cooled electrolyte flow stream 22 exits the heat exchanger 18 and is passed to an electrolyte reservoir/gas separator 24 wherein hydrogen gas and other gases which may be present in the electrolyte flow stream 22 are vented, as signified by the flow stream 26, resulting in an aqueous lithium hydroxide solution, depicted as a flow stream 28. The stream 28 is circulated from the reservoir/gas separator 24 to a contactor 30, which is preferably a solid/liquid contactor. The solid/liquid contactor 30 may, if desired, take the form of a tank wherein a solid bifluoride salt (described below) is added to the electrolyte flowing therethrough. Bifluoride salts generally will dissolve in the electrolyte upon addition or, if preferred, mixing of the bifluoride salt with electrolyte can be accomplished by any of a variety of conventional methods.

Alternatively, other methods of addition and mixing of the bifluoride salts with the electrolyte may be used in the practice of the invention. For example, the bifluoride salt may be prepared in the form of a cake of material through which the electrolyte will flow or, if preferred, the addition of the bifluoride salt may be metered and mixing accomplished by way of the turbulence generated by way of the pumping of the electrolyte. The bifluoride salt may also be prepared and used in the form of an aqueous solution. The use of such a solution, however, imposes the need of access to a source of water. In addition, the use of a solution of the bifluoride salt may pose one or more of the dangers associated with the use of liquid forms of simple acids, described herein.

A bifluoride salt is circulated from a storage container 32 through a stream 36 to the contactor 30 wherein the bifluoride salt dissolves and reacts with lithium hydroxide in the stream 28 to form a compound of lithium which is insoluble in the electrolyte, as described in more detail below.

A product stream 40 passes from the contactor 30 to a suitable liquid/solid separating means 42, such as a centrifuge or filter, for example, for the removal of solids, signified by a flow stream 44, including the insoluble compound of lithium. The compound so removed can be ejected from the cell to remove unnecessary weight, or it can be stored for later recovery of its lithium metal.

A pump 46 circulates the electrolyte from the separator 42 via a stream 50 to the cell stack 12, for use of the electrolyte in producing electrical power.

Rather than simple acids such as $H_3PO_4$, HF, etc., the invention utilizes bifluoride salts as electrolyte management agents. These bifluoride materials react with aqueous lithium hydroxide to generally yield one or more compounds or complex compounds which are insoluble in the electrolyte.

Bifluoride salts, preferably in solid form, are used in the invention to manage the concentration of lithium hydroxide in the electrolyte. Bifluoride salts may be considered hydrogen fluoride adducts to a fluoride salt, for example, $NH_4F \cdot HF$. These bifluoride materials have little or no volatility and therefore do not create an appreciable respiratory, dermal or opthomologic threat to those who handle or come in contact with the material.

Additionally, these materials are available in a solid, crystalline, free-flowing form. Thus, these materials, unlike liquid electrolyte management agents, do not present the dangerous possibility of accidental splashing that is generally associated with liquids. The solid form of electrolyte management agent of the invention thereby provides additional protection to handling personnel.

Suitable bifluoride materials for use in the practice of the invention include $NaF \cdot HF$, $KF \cdot HF$, $CsF \cdot HF$, $NH_4F \cdot HF$, $H_3NC_2H_4NH_3F_2 \cdot (HF)_2$, $NH_xR_{4-x}F \cdot HF$ and $H_yR_{3-y}N(CH_2)_nNR_{3-y}H_yF_2.(HF)_2$ wherein x is an integer from 0-4, inclusive, y is an integer from 0.3, inclusive, n is an integer equal to at least 1, and R is a lower alkyl group.

It is to be understood that, if desired, the bifluoride materials of the invention may be used in combination with each other or in combination with simple acids. Thus, for example, a slurry or paste of the solid $NH_4F.HF$ may be prepared by mixing therewith the liquid hydrofluoric acid. The use of such a combination of electrolyte management agents permits the user to balance the desirability for lower weight, such as provided by the use of hydrofluoric acid, with the improved safety provided through the use of bifluoride materials.

A prototype chemical reaction of this invention with the lithium hydroxide electrolyte is as follows:

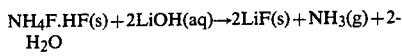

$$NH_4F.HF(s) + 2LiOH(aq) \rightarrow 2LiF(s) + NH_3(g) + 2H_2O$$

The solid electrolyte management material, $NH_4F.HF$, reacts with the dissolved lithium hydroxide to yield lithium fluoride which is insoluble in the electrolyte, ammonia gas, and two moles of water. The ammonia gas so produced is in relatively minor amounts and is easily vented.

The following examples illustrate compounds useful in the practice of the invention. It is understood that all changes and modifications that come within the spirit of the invention are desired to be protected and thus the invention is not to be construed to as limited by these examples.

A 4.0 molar solution of lithium hydroxide monohydrate, $LiOH.H_2O$, in deionized water was prepared. This solution is a prototypical electrolyte for lithium-/aqueous alkaline electrolyte batteries.

EXAMPLE A

Ammonium bifluoride, $(NH_4)HF_2$, was added to 50 cc of the above-described 4.0 M $LiOH.H_2O$ solution in a stirred beaker. The flakes of $(NH_4)HF_2$ quickly dissolved and a fine white precipitate resulted.

EXAMPLE B

Sodium bifluoride, $NaHF_2$, in pellet form, was added to 50 cc of the above-described 4.0 M $LiOH.H_2O$ solution. Upon dissolution, a fine white precipitate resulted.

EXAMPLE C

Potassium bifluoride, $KHF_2$ in the form of a fine white granular powder, was added to 50 cc of the above-described 4.0 M $LiOH.H_2O$ solution in a stirred beaker. The $KHF_2$ powder dissolved slower than the ammonium bifluoride flakes but faster than the sodium bifluoride pellets. Upon dissolution, a fine white precipitate resulted.

The foregoing detailed description is given for clearness of understanding only, and no unnecessary limitations are to be understood therefrom, as modifications within the scope of the invention will be obvious to those skilled in the art.

We claim:

1. A power generation system comprising:
   an electrochemical cell including a reactive metal anode, a cathode spaced from said anode, and an electrolyte comprising an aqueous solution of the hydroxide of said reactive metal;
   a source of at least one complex comprising a hydrogen fluoride adduct to a fluoride salt which upon contact with said electrolyte precipitates at least one compound of said reactive metal which is insoluble in said electrolyte;
   means for contacting said electrolyte with said complex to form at least one compound of said reactive metal which is insoluble in said electrolyte;
   means for separating said compound from said electrolyte; and
   means for recirculating said separated electrolyte to said electrochemical cell.

2. The system of claim 1 wherein said reactive metal comprises an alkali metal.

3. The system of claim 2 wherein said alkali metal comprises lithium.

4. The system of claim 1 wherein said complex comprises a compound selected from a group consisting of $NaF.HF$, $KF.HF$, $CsF.HF$, $NH_4F.HF$, $H_3NC_2H_4NH_3F_2.(HF)_2$, $NH_xR_{4-x}F.HF$ and $H_yR_{3-y}N(CH_2)_nNR_{3-y}H_yF_2.(HF)_2$ wherein x is an integer from 0-4, inclusive, y is an integer from 0-3, inclusive, n is an integer equal to at least 1, and R is a lower alkyl group.

5. The system of claim 1 wherein said complex comprises a mixture of first and second complexes comprising hydrogen fluoride adducts to fluoride salts.

6. The system of claim 1 wherein said complex additionally comprises a simple acid in combination with said complex which upon contact with said electrolyte precipitates an insoluble salt of said reactive metal.

7. The system of claim 6 wherein said simple acid is HF.

8. The system of claim 7 wherein said complex comprises $NH_4F.HF$.

9. A method of power generation, said method comprising the steps of:
   supplying an electrolyte to an electrochemical reaction zone defined between a reactive metal anode and a cathode spaced from said anode in an electrochemical cell, said electrolyte comprising an aqueous solution of the hydroxide of said reactive metal;
   contacting said electrolyte with at least one complex comprising a hydrogen fluoride adduct to a fluoride salt which, upon contact with said electrolyte, precipitates at least one compound of said reactive metal which is insoluble in said electrolyte;
   separating said compound from said electrolyte; and
   recirculating said separated electrolyte to said reaction zone.

10. The method of claim 9 wherein said reactive metal comprises an alkali metal.

11. The method of claim 10 wherein said alkali metal comprises lithium.

12. The method of claim 9 wherein said complex comprises a compound selected from a group consisting of $NaF.HF$, $KF.HF$, $CsF.HF$, $NH_4F.HF$, $H_3NC_2H_4NH_3F_2.(HF)_2$, $NH_xR_{4-x}F.HF$ and $H_yR_{3-y}N(CH_2)_nNR_{3-y}H_yF_2.(HF)_2$ wherein x is an integer from 0-4, inclusive, y is an integer from 0-3, inclusive, n is an integer equal to at least 1, and R is a lower alkyl group.

13. The method of claim 9 wherein said complex comprises a mixture of first and second complexes comprising hydrogen fluoride adducts to fluoride salts.

14. The method of claim 9 wherein said complex comprises a simple acid in combination with said complex, which upon contact with said electrolyte, precipitates an insoluble salt of said reactive metal.

15. The method of claim 14 wherein said simple acid is HF.

16. The method of claim 15 wherein said complex comprises $NH_4F.HF$.

* * * * *